United States Patent
La Forest et al.

(10) Patent No.: US 10,022,890 B2
(45) Date of Patent: Jul. 17, 2018

(54) IN SITU CARBONIZATION OF A RESIN TO FORM A CARBON-CARBON COMPOSITE

(71) Applicant: Honeywell International Inc., Morristown, NJ (US)

(72) Inventors: Mark L. La Forest, Theresa, NY (US); Slawomir T. Fryska, Granger, IN (US); David Flask, Granger, IN (US); Jeffrey Troester, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 160 days.

(21) Appl. No.: 14/854,993

(22) Filed: Sep. 15, 2015

(65) Prior Publication Data
US 2017/0072587 A1     Mar. 16, 2017

(51) Int. Cl.
   *B29C 71/04*    (2006.01)
   *B28B 1/00*     (2006.01)
   (Continued)

(52) U.S. Cl.
   CPC ......... *B28B 1/001* (2013.01); *B22F 3/00* (2013.01); *B29C 64/106* (2017.08);
   (Continued)

(58) Field of Classification Search
   CPC ... B29C 64/106; B29C 64/112; B29C 64/118; B29C 64/165; B29C 64/295;
   (Continued)

(56) References Cited

U.S. PATENT DOCUMENTS

| 3,028,284 A | 4/1962 | Reeves |
| 3,596,314 A | 8/1971 | Krugler |

(Continued)

FOREIGN PATENT DOCUMENTS

| CN | 101511569 A | 8/2009 |
| CN | 103939509 A | 7/2014 |

(Continued)

OTHER PUBLICATIONS

Extended Search Report from counterpart European Application No. 16188430.9 dated Apr. 20, 2017, 13 pp.

(Continued)

*Primary Examiner* — Leo B Tentoni
(74) *Attorney, Agent, or Firm* — Shumaker & Sieffert, P.A.

(57) ABSTRACT

In some examples, the disclosure describes a method including depositing a first layer including a resin and at least one of a carbon fiber or a carbon fiber precursor material on a work surface of a three-dimensional printing system, carbonizing at least the resin of the first layer using a carbonizer attached to the three-dimensional printer to form a first layer of carbon-carbon composite including carbon fibers and carbonized matrix material, depositing an additional layer including a resin and at least one of a carbon fiber or a carbon fiber precursor material of material on the first layer of carbon-carbon composite, and carbonizing at least the resin of the additional layer using the carbonizer to form an additional layer of carbon-carbon composite on the first layer of carbon-carbon composite.

8 Claims, 10 Drawing Sheets

(51) Int. Cl.

| | | |
|---|---|---|
| *B29C 64/118* | (2017.01) | |
| *B29C 64/295* | (2017.01) | |
| *B29C 64/112* | (2017.01) | |
| *B29C 64/165* | (2017.01) | |
| *C04B 35/83* | (2006.01) | |
| *F16D 69/02* | (2006.01) | |
| *G03G 15/22* | (2006.01) | |
| *B22F 3/00* | (2006.01) | |
| *C04B 35/622* | (2006.01) | |
| *C01B 32/00* | (2017.01) | |
| *C01B 32/05* | (2017.01) | |
| *B29C 64/106* | (2017.01) | |
| *B33Y 10/00* | (2015.01) | |
| *B33Y 30/00* | (2015.01) | |
| *B33Y 80/00* | (2015.01) | |
| *B29C 35/08* | (2006.01) | |
| *F16D 69/00* | (2006.01) | |

(52) U.S. Cl.
CPC .......... *B29C 64/112* (2017.08); *B29C 64/118* (2017.08); *B29C 64/165* (2017.08); *B29C 64/295* (2017.08); *C01B 32/00* (2017.08); *C01B 32/05* (2017.08); *C04B 35/622* (2013.01); *C04B 35/83* (2013.01); *F16D 69/023* (2013.01); *G03G 15/224* (2013.01); B29C 2035/0811 (2013.01); B29C 2035/0838 (2013.01); *B33Y 10/00* (2014.12); *B33Y 30/00* (2014.12); *B33Y 80/00* (2014.12); C04B 2235/6026 (2013.01); C04B 2235/665 (2013.01); F16D 2069/008 (2013.01); F16D 2200/0052 (2013.01); F16D 2200/0086 (2013.01); F16D 2250/00 (2013.01)

(58) Field of Classification Search
CPC ............. B29C 71/04; B29C 2035/0811; B29C 2035/0838; C01B 32/05
USPC ..... 264/29.1, 29.5, 113, 129, 134, 135, 136, 264/137, 308, 482, 483, 486
See application file for complete search history.

(56) References Cited

U.S. PATENT DOCUMENTS

| | | |
|---|---|---|
| 3,703,255 A | 11/1972 | Wade |
| 3,975,128 A | 8/1976 | Schluter |
| 3,982,877 A | 9/1976 | Wyeth et al. |
| 4,264,556 A | 4/1981 | Kumar et al. |
| 4,428,906 A | 1/1984 | Rozmus |
| 4,756,680 A | 7/1988 | Ishii |
| 4,837,073 A | 6/1989 | McAllister et al. |
| 4,957,585 A | 9/1990 | Semff |
| 5,009,823 A | 4/1991 | Kromrey |
| 5,137,663 A | 8/1992 | Conaway |
| 5,137,755 A | 8/1992 | Fujikawa et al. |
| 5,147,588 A | 9/1992 | Okura et al. |
| 5,178,705 A | 1/1993 | Kimbara et al. |
| 5,187,001 A | 2/1993 | Brew |
| 5,242,746 A | 9/1993 | Bommier et al. |
| 5,283,109 A | 2/1994 | Kaplan et al. |
| 5,306,448 A | 4/1994 | Kromrey |
| 5,382,392 A | 1/1995 | Prevorsek et al. |
| 5,516,271 A | 5/1996 | Swenor et al. |
| 5,518,385 A | 5/1996 | Graff |
| 5,576,358 A | 11/1996 | Lem et al. |
| 5,686,144 A | 11/1997 | Thebault et al. |
| 5,759,622 A | 6/1998 | Stover |
| 5,962,135 A | 10/1999 | Walker et al. |
| 6,054,082 A | 4/2000 | Heide et al. |
| 6,093,482 A | 7/2000 | Park et al. |
| 6,110,268 A | 8/2000 | Gross et al. |
| 6,214,279 B1 | 4/2001 | Yang et al. |
| 6,221,475 B1 | 4/2001 | Domergue et al. |
| 6,245,424 B1 | 6/2001 | Lau et al. |
| 6,261,486 B1 | 7/2001 | Sulzbach et al. |
| 6,267,920 B1 | 7/2001 | Arakawa et al. |
| 6,305,925 B1 | 10/2001 | Cassani |
| 6,325,608 B1 | 12/2001 | Shivakumar et al. |
| 6,358,565 B1 | 3/2002 | Krenkel et al. |
| 6,372,166 B1 | 4/2002 | Cassani |
| 6,455,159 B1 | 9/2002 | Walker et al. |
| 6,471,800 B2 | 10/2002 | Jang et al. |
| 6,508,970 B2 | 1/2003 | Chandra |
| 6,521,152 B1 | 2/2003 | Wood et al. |
| 6,537,470 B1 | 3/2003 | Wood et al. |
| 6,555,173 B1 | 4/2003 | Forsythe et al. |
| 6,578,474 B1 | 6/2003 | Sasaki |
| 6,726,753 B2 | 4/2004 | Kouchouthakis et al. |
| 6,749,937 B2 | 6/2004 | Gray |
| 6,756,121 B2 | 6/2004 | Forsythe et al. |
| 6,884,467 B2 | 4/2005 | Walker et al. |
| 6,886,668 B2 | 5/2005 | Kouchouthakis et al. |
| 6,896,968 B2 | 5/2005 | Golecki |
| 6,939,490 B2 | 9/2005 | La Forest et al. |
| 7,025,913 B2 | 4/2006 | La Forest et al. |
| 7,052,632 B2 | 5/2006 | Lavasserie et al. |
| 7,063,870 B2 | 6/2006 | La Forest et al. |
| 7,118,805 B2 | 10/2006 | Walker et al. |
| 7,141,207 B2 | 11/2006 | Jandeska, Jr. et al. |
| 7,172,408 B2 | 2/2007 | Wood et al. |
| 7,198,739 B2 | 4/2007 | La Forest et al. |
| 7,252,499 B2 | 8/2007 | La Forest et al. |
| 7,258,896 B2 | 8/2007 | Deckard et al. |
| 7,318,717 B2 | 1/2008 | Wood et al. |
| 7,332,112 B1 | 2/2008 | Shivakumar et al. |
| 7,332,195 B2 | 2/2008 | Arico et al. |
| 7,370,738 B2 | 5/2008 | Vollweiter |
| 7,393,370 B2 | 7/2008 | Peterman, Jr. et al. |
| 7,423,072 B2 | 9/2008 | Lee et al. |
| 7,442,024 B2 | 10/2008 | La Forest et al. |
| 7,556,490 B2 | 7/2009 | Wicker et al. |
| 7,589,868 B2 | 9/2009 | Velde et al. |
| 7,632,435 B2 | 12/2009 | Simpson et al. |
| 7,681,627 B2 | 3/2010 | Schmitz et al. |
| 7,698,817 B2 | 4/2010 | Khambete et al. |
| 7,700,014 B2 | 4/2010 | Simpson et al. |
| 7,727,448 B2 | 6/2010 | Boutefeu et al. |
| 7,867,566 B2 | 1/2011 | Blanton et al. |
| 7,972,129 B2 | 7/2011 | O'Donoghue |
| 8,002,919 B2 | 8/2011 | Johnson et al. |
| 8,492,466 B2 | 7/2013 | Abe et al. |
| 8,501,033 B2 | 8/2013 | Southwell et al. |
| 8,592,519 B2 | 11/2013 | Martinoni |
| 8,597,772 B2 | 12/2013 | La Forest et al. |
| 8,742,014 B2 | 6/2014 | Hongo |
| 2001/0030094 A1 | 10/2001 | Pareti |
| 2002/0047227 A1 | 4/2002 | Matsumoto |
| 2003/0021901 A1 | 1/2003 | Gasse |
| 2003/0030188 A1 | 2/2003 | Spengler |
| 2003/0111752 A1 | 6/2003 | Wood et al. |
| 2003/0143436 A1 | 7/2003 | Forsythe et al. |
| 2003/0214064 A1 | 11/2003 | Shin et al. |
| 2004/0020728 A1 | 2/2004 | Koucouthakis et al. |
| 2004/0113302 A1 | 6/2004 | La Forest et al. |
| 2004/0168612 A1 | 9/2004 | Saver |
| 2004/0202896 A1 | 10/2004 | Gray |
| 2004/0219510 A1 | 11/2004 | Lowery et al. |
| 2006/0046059 A1 | 3/2006 | Arico et al. |
| 2006/0069176 A1 | 3/2006 | Bowman et al. |
| 2006/0197244 A1 | 9/2006 | Simpson et al. |
| 2006/0232392 A1 | 10/2006 | Emmett et al. |
| 2006/0267252 A1 | 11/2006 | Steinmann et al. |
| 2006/0279012 A1 | 12/2006 | Simpson et al. |
| 2007/0063378 A1 | 3/2007 | O'Donoghue |
| 2007/0154712 A1 | 7/2007 | Mazany et al. |
| 2007/0218208 A1 | 9/2007 | Walker et al. |
| 2008/0318010 A1 | 12/2008 | Wozniak et al. |
| 2009/0145314 A1 | 6/2009 | Botrie |
| 2009/0169825 A1 | 7/2009 | Farmer et al. |
| 2009/0176034 A1 | 7/2009 | Ruuttu et al. |
| 2009/0229926 A1 | 9/2009 | Schaefer |

(56) References Cited

U.S. PATENT DOCUMENTS

| | | | |
|---|---|---|---|
| 2009/0298962 | A1 | 12/2009 | Studer et al. |
| 2009/0321979 | A1 | 12/2009 | Hiraide |
| 2010/0000070 | A1 | 1/2010 | La Forest et al. |
| 2011/0030940 | A1 | 2/2011 | Takeda |
| 2012/0104659 | A1 | 5/2012 | La Forest et al. |
| 2012/0251829 | A1 | 10/2012 | Xu et al. |
| 2012/0304449 | A1 | 12/2012 | Jackson et al. |
| 2013/0157826 | A1 | 6/2013 | Preckel et al. |
| 2013/0174969 | A1 | 7/2013 | Karb et al. |
| 2013/0237636 | A1 | 9/2013 | Strauss |
| 2013/0244039 | A1 | 9/2013 | Peters et al. |
| 2013/0248304 | A1 | 9/2013 | Lee et al. |
| 2013/0284548 | A1 | 10/2013 | Guether et al. |
| 2014/0134335 | A1 | 5/2014 | Pridoehl et al. |
| 2014/0194328 | A1 | 7/2014 | Alessi |
| 2014/0298728 | A1 | 10/2014 | Keshavan |
| 2014/0356612 | A1 | 12/2014 | Sano et al. |
| 2014/0361460 | A1 | 12/2014 | Mark |
| 2015/0018136 | A1 | 1/2015 | Goldstein et al. |
| 2015/0093506 | A1 | 4/2015 | Bucci et al. |
| 2015/0321187 | A1* | 11/2015 | Dias ............... B01J 37/0018 562/531 |
| 2016/0046803 | A1* | 2/2016 | Boday ............ B29C 67/0055 264/129 |
| 2016/0082695 | A1 | 3/2016 | Swartz et al. |
| 2016/0151982 | A1* | 6/2016 | Sand ............. B29C 67/0055 264/308 X |
| 2016/0346997 | A1 | 12/2016 | Lewis |

FOREIGN PATENT DOCUMENTS

| | | |
|---|---|---|
| CN | 104451606 A | 3/2015 |
| CN | 104496508 A | 4/2015 |
| DE | 102007057450 A1 | 6/2009 |
| DE | 102014006432 A1 | 11/2015 |
| EP | 1165191 A1 | 1/2002 |
| EP | 1724245 EP | 11/2006 |
| EP | 1731292 EP | 12/2006 |
| EP | 2295227 A2 | 3/2011 |
| EP | 2450170 A2 | 9/2012 |
| EP | 3095593 A1 | 11/2016 |
| GB | 2386951 | 1/2003 |
| GB | 2470098 | 11/2010 |
| JP | 2013088196 | 5/2013 |
| JP | 5352893 B2 | 11/2013 |
| WO | 3908980 WO | 2/1999 |
| WO | 0054852 A1 | 9/2000 |
| WO | 2004050319 WO | 6/2004 |
| WO | 2004052629 WO | 6/2004 |
| WO | 2004106766 | 12/2004 |
| WO | 2006033373 A1 | 3/2006 |
| WO | 2006086167 WO | 8/2006 |
| WO | 2013126981 A1 | 9/2013 |
| WO | 2014035382 A1 | 3/2014 |
| WO | 2014060430 A1 | 4/2014 |
| WO | 2014134224 A2 | 9/2014 |
| WO | 2014153535 A2 | 9/2014 |
| WO | 2014174540 A1 | 10/2014 |
| WO | 2014175625 A1 | 10/2014 |
| WO | 2015006697 A1 | 1/2015 |
| WO | 2015038260 A2 | 3/2015 |
| WO | 2015053658 A1 | 4/2015 |

OTHER PUBLICATIONS

Senese, "MarkForged Lets you 3D Print with Carbon Fiber and Kevlar on a Budget," Makezine, retrieved from URL: http://makezine.com/ 2015/01/ 15/3d-printed-carbon-fiber-markforged and accessed Nov. 11, 2016, Jan. 15, 2015, 6 pp.

U.S. Appl. No. 15/048,840, by Honeywell International Inc. (Inventors: Jeffrey Rowe et al.), filed Feb. 19, 2016.

U.S. Appl. No. 14/954,783, by Honeywell International Inc. (Inventors: Mark L. La Forest et al.), filed Nov. 30, 2015.

"Application of nanoparticles could improve ALM components," technical trends ALM, MPR, Elsevier Ltd., Nov.-Dec. 2012, 3 pp.

"Arevo Labs introduces carbon fiber reinforced polymers to 3D print ultra-strong parts," 3D printer and 3D printing news, www.3ders.org, Mar. 24, 2014, 9 pp.

"Carbon-fiber filled Nylon—A Material Alternative," Northwest Rapid Manufacturing, Jun. 25, 2012, 3 pp.

"Mark One, the world's first carbon fiber 3D printer now available for pre-order," 3D printer and 3D printing news, www.3ders.org, Feb. 18, 2014, 11 pp.

Black, "3D Printing continuous carbon fiber composites?," Composites World, Gardner Business Media, Inc., May 1, 2014, 8 pp.

Divyashree et al., "Design, Implement and Develop CNT—Metal Composite PCB Wiring Using a Metal 3D Printer," International Journal of Scientific & Engineering Research, vol. 5, No. 5, May 2014, 5 pp.

Krassenstein, "3DXTech's Carbon Nanotube 3D Printer Filament is Here: Exclusive images and details," 3DXTECH, May 13, 2014, 2 pp.

Thryft, "3D Printing High-Strength Carbon Composites Using PEEK, PAEK," Design News, Engineering Materials, Apr. 14, 2014, 5 pp.

Vie et al., "Inkjet printing of 200 nm monodisperse carbon nanoparaticles: from nanoparticles synthesis to smart ink formulation," NSTI-Nanotech, vol. 2, May 2013, pp. 243-246.

Crandall, "Where Will Additive Manufacturing Take Us?," APICS Magazine, Jan./Feb. 2013, 3 pp.

U.S. Appl. No. 14/711,550, by Honeywell International Inc. (Inventors: Slawomir T. Fryska et al.), filed May 13, 2015.

U.S. Appl. No. 14/711,426, by Honeywell International Inc. (Inventors: Jeffrey Troester et al.), filed May 13, 2015.

U.S. Appl. No. 14/711,508, by Honeywell International Inc. (Inventors: Slawomir T. Fryska et al.), filed May 13, 2015.

U.S. Appl. No. 14/788,217, by Honeywell International Inc. (Inventors: Mark L. La Forest et al.), filed Jun. 30, 2015.

U.S. Appl. No. 14/711,590, by Honeywell International Inc. (Inventors: Jeffrey Troester et al.), filed May 13, 2015.

U.S. Appl. No. 62/161,109, by Honeywell International Inc. (Inventors: Jeffrey Rowe et al.), filed May 13, 2015.

Fatz, et al., "Manufacture of Functionally Gradient Carbon-Carbon Composites," Proceedings of the 17th Technical Conference of the American Society of Composites, Oct. 21-23, 2002, Purdue University, West Lafayette, Ind., 9 pp.

Tekinalp et al., "Highly oriented carbon fiber-polymer composites via additive manufacturing," Composites Science and Technology, ElSevier, Oct. 9, 2014, 7 pp.

Response to Extended Search Report dated Apr. 20, 2017, from counterpart European Application No. 116188430, sled filed Aug. 14, 2017, 9 pp.

Office Action from U.S. Appl. No. 14/711,590 dated Nov. 30, 2017, 15 pp.

Response to Office Action dated Nov. 30, 2017, from U.S. Appl. No. 14/711,590, filed Feb. 26, 2018, 10 pp.

Final Office Action from U.S. Appl. No. 14/711,590, dated May 8, 2018, 15 pp.

\* cited by examiner

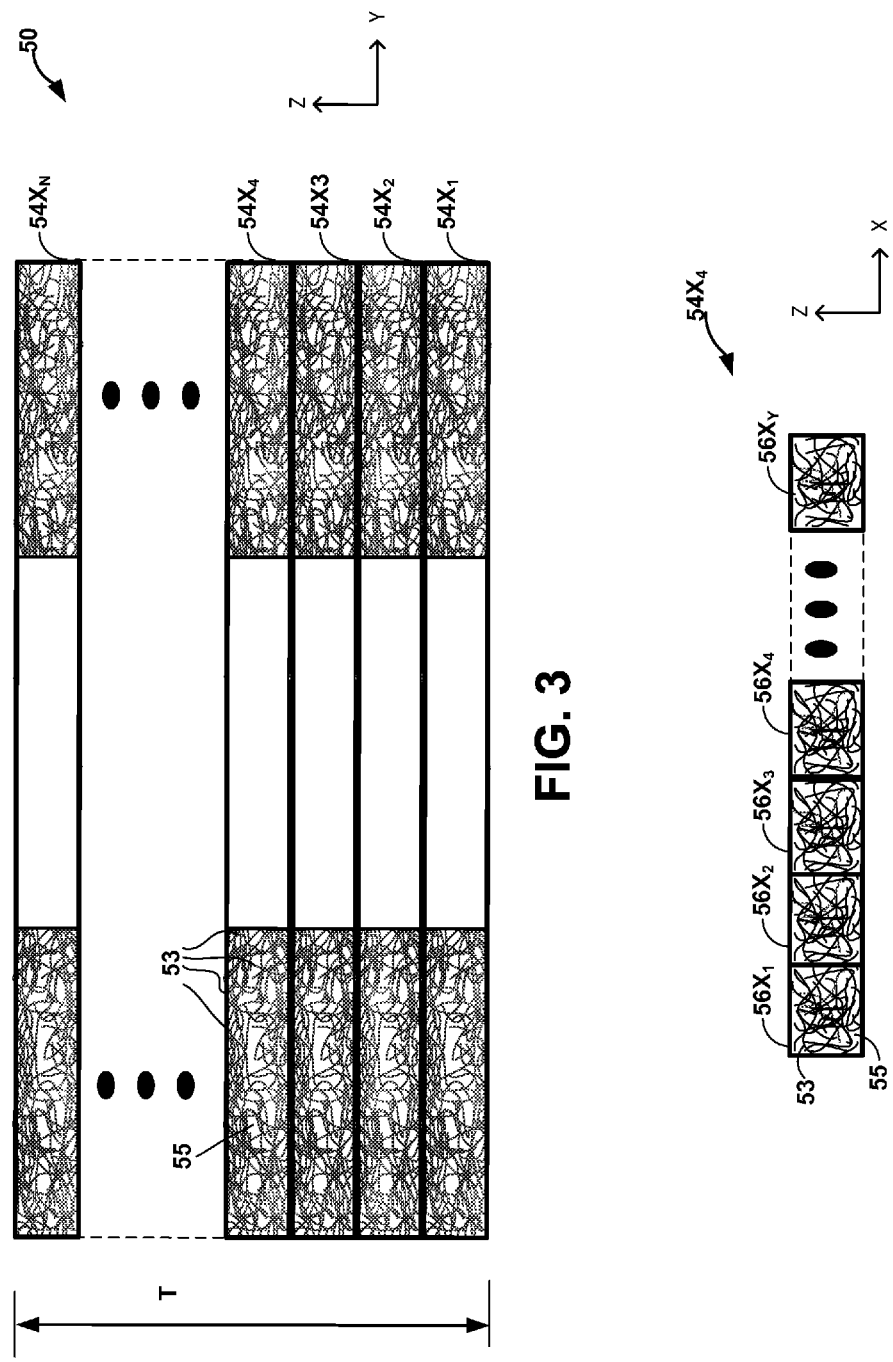

IN SITU CARBONIZATION OF A RESIN TO FORM A CARBON-CARBON COMPOSITE

TECHNICAL FIELD

The disclosure relates to carbon composite materials, e.g., carbon-carbon composite materials used in brake friction materials.

BACKGROUND

Carbon fiber-reinforced carbon materials, also referred to as carbon-carbon composite materials, are composite materials that include carbon fibers reinforced in a matrix of carbon material. The carbon-carbon composite components can be used in many high temperature applications. For example, the aerospace industry employs carbon-carbon composite components as friction materials for commercial and military aircraft, such as brake friction materials.

SUMMARY

Devices, systems, and techniques for forming a carbon-carbon composite component that includes a plurality of composite layers including carbon fibers and carbonized matrix material are described. In some examples the disclosure describes a method for forming a carbon-carbon composite component made up of a plurality of composite layers of carbon fibers and carbonized matrix material formed using an three-dimensional printing process, e.g., with a three-dimensional printer system. In some examples, the composite layers are formed using a three-dimensional printer system to deposit at least a resin (e.g., a resin, a mixture of carbon fibers and a resin, or a carbon fiber coated with a resin) on a work surface of the three-dimensional printer. Following the deposition of the resin, a carbonizer (e.g., a concentrated laser beam) of the three-dimensional printer may heat the resin to induce carbonization through an iterative process and convert the resin into a carbonized matrix material thereby forming the composite layer. The process may be repeated to add and form additional composite layers to produce a multilayered carbon-carbon composite component having a desired geometry (e.g., thickness) and density.

In some examples, the disclosure describes a method including depositing a first layer of material on a work surface of a three-dimensional printing system, the first layer of material including a resin and at least one of a carbon fiber, a carbon fiber material, or a carbon fiber precursor material. The method also including carbonizing at least the resin of the first layer of material using a carbonizer attached to the three-dimensional printer to form a first layer of carbon-carbon composite including carbon fibers and carbonized matrix material. The method also including depositing an additional layer of material on the first layer of carbon-carbon composite, the additional layer of material including a resin and at least one of a carbon fiber, a carbon fiber material, or a carbon fiber precursor material. The method also including carbonizing at least the resin of the additional layer of material using the carbonizer to form an additional layer of carbon-carbon composite on the first layer of carbon-carbon composite.

In some examples, the disclosure describes a system including at least one print head configured to deposit a resin relative a work surface, a carbonizer configured to carbonize the resin deposited relative to the work surface to form a carbonized matrix material, and a controller configured to control depositing and carbonizing the resin relative the work surface to form a plurality of carbon-carbon composite layers including carbon fibers and a carbonized matrix material formed from carbonization of the resin.

In some examples, the disclosure describes a carbon-carbon composite article comprising a composite layer including carbon fibers and a carbonized matrix material, where the composite layer is formed by depositing at least one of a carbon fiber, a carbon fiber material, or a carbon fiber precursor material and a resin on a work surface of a three-dimensional printing system, and carbonizing the resin via a carbonizer of the three-dimensional printing system to form the carbonized matrix material.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3 is a schematic diagram illustrating an example cross-section of the carbon-carbon composite component of FIG. 2.

FIG. 4 is a schematic diagram illustrating an example cross-section of a layer of the carbon-carbon composite component of FIG. 2.

DETAILED DESCRIPTION

Figure 1:
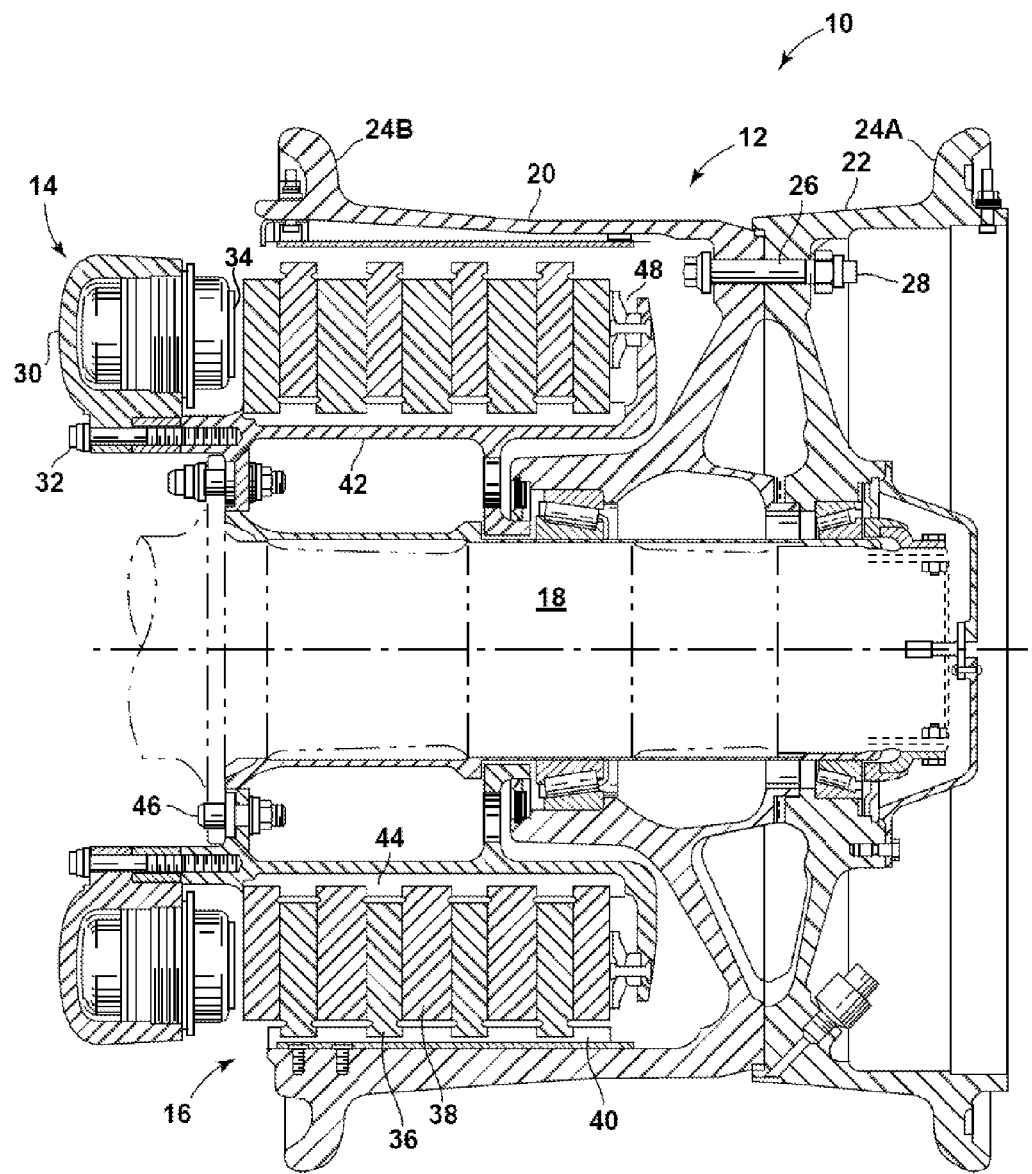
FIG. 1 is a schematic block diagram illustrating an example aircraft brake assembly.

Example techniques for forming a densified carbon-carbon composite component are described herein. In some examples, the densified carbon-carbon composite components may be used as a friction material, e.g., as an aircraft brake disc. In the case of an aircraft brake pad, in some examples, the carbon-carbon composite component may take the form of an annular ring, although other shapes may also be used.

Densified carbon-carbon composite components used, for example, in aerospace applications such as brake pads, may be formed from carbon fiber preforms that have been densified using a variety of densification techniques. For example, a carbon fiber preform may be formed by layering fabric sheets formed of woven or nonwoven carbon fiber, which may be then be densified as a whole by chemical vapor infiltration (CVI) or chemical vapor deposition (CVD) to achieve a carbon-carbon composite component exhibiting a desired final density. Such techniques however can be slow and take several applications to achieve the desired final densify.

Additionally or alternatively, the preform may be densified by infiltrating the entire preform with liquid resin using, for example, vacuum pressure infiltration (VPI) and/or resin transfer molding (RTM) followed by carbonization of the resin. Such techniques may be faster than CVI/CVD but can result in a non-uniform density gradient throughout the carbon-carbon composite component that may need further processing to obtain the desired density. Additionally, some resins may require an intermediate resin stabilization cycle prior to undergoing carbonization. During the resin stabilization cycle, the resin may undergo some degree of crosslinking or polymerization, which may help solidify the resin and inhibit the resin from liquefying and leeching out or the infiltrated preform as the temperature of resin is elevated to the point of carbonization.

However, the resin stabilization cycle can be extremely time intensive, requiring several months for the resin to undergo sufficient crosslinking. Furthermore, even with resin stabilization, some amount of resin may be forced out of the preform during carbonization because of gases evolved from the resin as it is converted to char. In contrast to CVD/CVI and techniques including resin stabilization, by utilizing the techniques described herein, the deposition, stabilization, and/or carbonization of the resin may be done in an in situ fashion, e.g. iteratively converting localized (e.g., relatively small) sections of resin to carbon to form a layer of composite material, that may significantly reduce the manufacturing time and cost while still providing a high density carbon-carbon composite material.

In accordance with one or more examples of the disclosure, a carbon-carbon composite component may include a plurality of layers including carbon fibers combined with a resin that has undergone carbonization to form a carbonized matrix material. In one example, the plurality of layers may be formed by sequentially depositing a composite mixture including a plurality of carbon fibers or carbon fiber precursor material (collectively "carbon fibers") in a resin material via a three dimensional printing system, followed by carbonizing the resin using a carbonizer of the three-dimensional printing system. For example, the carbon-carbon composite component may include a plurality of layers, where each layer is formed sequentially by depositing the composite mixture via at least one print head of a three-dimensional printing system onto a work surface, e.g., previously formed layers of the carbon-carbon composite component. A carbonizer connected to the three-dimensional printing system may then heat localized sections of the deposited composite mixture to induce carbonization of the resin and, in some cases, carbonization of the carbon fibers of the composite mixture to form a layer of carbon fibers and carbonized matrix material. During the iterative deposition and carbonization processes, the position of the print head and carbonizer may be controlled in a three-dimensional space such that the layers of the carbon-carbon composite component are sequentially formed in three-dimensions to define a carbon fiber preform with a desired geometry.

In other examples, rather depositing a composite mixture including carbon fibers combined with a resin material, the individual layers of a carbon fibers and resin may be formed simultaneously by depositing, via at least one print head of a three-dimensional printing system, a plurality of individual carbon fibers each coated with resin. For example, the three-dimensional printing system may employ a pultrusion process to coat a substantially continuous (e.g., continuous or nearly continuous) carbon fiber filament or carbon fiber precursor filament (collectively "carbon filaments") with the resin and then cut the coated filament into a plurality of carbon filaments coated with resin. In some examples, the substantially continuous (e.g., continuous or nearly continuous) carbon filament may be a single filament or tow of carbon filaments. The individual coated carbon filaments may then be deposited via the print head of a three-dimensional printing system. After being deposited, a carbonizer may be engaged to iteratively induce carbonization of the resin and, in some cases, carbonization of the carbon filaments to form a layer of carbon fibers and carbonized matrix material. Again, the three-dimensional printing process may be repeated to generate a multilayer carbon-carbon composite component having a desired three-dimensional geometry.

In other examples, the carbon fibers and resin may be deposited on layer-by-layer basis though independent application techniques. For example, each layer of the carbon-carbon composite may be formed via a three-dimensional printing system by first depositing a layer of carbon fiber material on a work surface containing a previously formed carbon-carbon composite layer. After depositing the carbon fiber material, using the same or a different three-dimensional printing system, a resin may be deposited on the recently deposited carbon fiber material allowing the resin to infiltrate the carbon fiber material. After infiltration, a carbonizer may be engaged to iteratively induce carbonization of the resin and, in some cases, carbonization of the carbon fiber material to form a layer of carbon fibers and carbonized matrix material. Again, the three-dimensional printing process may be repeated to generate a multilayer carbon-carbon composite component having a desired three-dimensional geometry.

In other examples, the carbon fibers may be deposited in a prefabricated form, e.g., a sheet of carbon fibers. For example, in such examples, the sheet of carbon fibers may be added to previously formed layers of carbon-carbon composite. After being added, a three-dimensional printing system may deposit a resin on the sheet of carbon fibers allowing the resin to infiltrate the fibers. After infiltration, a carbonizer may be engaged to iteratively induce carbonization of the resin and, in some cases, carbonization of the carbon fibers to form a layer of carbon fibers and carbonized matrix material. The entire process may be repeated to generate a multilayer carbon-carbon composite component having a desired three-dimensional geometry.

Examples of the disclosure may provide for one or more advantages over other methods. For example, in some instances, examples of the disclosure may provide for reduced cost of manufacturing of materials by limiting the amount of excess carbon fibers and carbon matrix material as well as increase uniformity of the product by densifying and carbonizing localized sections of material on a layer-by-layer basis. In some examples, increased uniformity may desirably impact wear and stopping performance as well as deter oxidation of the resulting carbon-carbon composite if designed in such a manner. Additionally, by utilizing a three-dimensional printing process to form a multilayered carbon-carbon composite component, the overall component may be fabricated with improved control (e.g., uniformity) of properties, such as, e.g., composition, across the volume of the carbon-carbon component compared to other existing techniques such as, e.g., the layering of carbon fibers followed by resin densification of the layered fabric segments and carbonization of the resulting bulk component. Additionally, stabilizing and/or carbonizing the resin in an in situ, e.g., localized, fashion may allow for greater conversion of the resin to carbonized matrix material and significant reduction in manufacturing time. For example, by using the carbonizer to carbonize a localized (e.g., relatively small) section of resin through focused heating, e.g., carbonization of a localized area defined by a concentrated laser beam, the localized section of resin may be rapidly (e.g., nearly instantaneously) heated to the point of carbonization while also avoiding the chance for the resin to liquefy and leech from the layers of carbon fibers. The resulting process may lead to a greater retention and conversion of the resin to char, e.g., carbon, while also avoiding the need for a lengthy resin stabilization cycle.

FIG. 1 is a conceptual diagram illustrating an example aircraft brake assembly 10 that may include one or more carbon-carbon composite components formed in accordance with the techniques of this disclosure. For ease of description, examples of the disclosure will be described primarily with regard to aircraft brake discs formed of carbon-carbon composite components. However, the techniques of this disclosure may be used to form carbon-carbon composite components other than aircraft brake discs. For example, the carbon-carbon composite components may be used as friction materials in other types of braking applications, as well as in other applications such as, e.g., heat exchangers and heat shields.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stator discs 38; rotor discs 36 are configured to move relative to stator discs 38. Rotor discs 36 are mounted to wheel 12, and in particular wheel hub 20, by beam keys 40. Stator discs 38 are mounted to axle 18, and in particular torque tube 42, by splines 44. Wheel assembly 10 may support any variety of private, commercial, or military aircraft.

Wheel assembly 10 includes wheel 12, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking (e.g., rejected takeoff) may result in component temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures.

Figure 2:
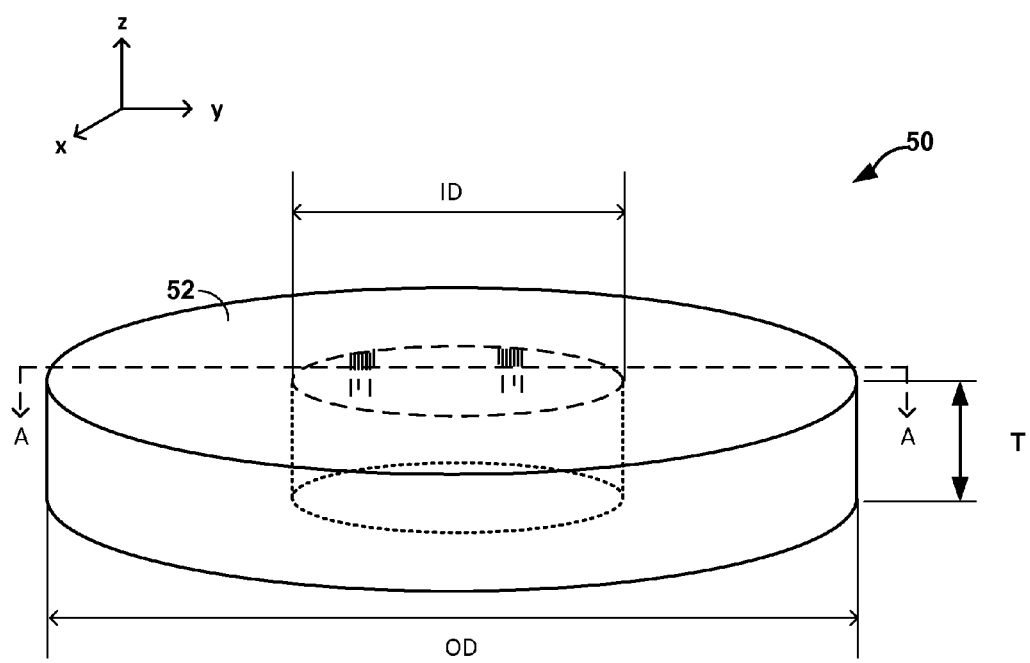
FIG. 2 is a conceptual diagram illustrating an example carbon-carbon composite component.

In one example, rotor discs 36 and/or stator discs 38 are formed of a carbon-carbon composite component fabricated according to one or more example techniques of this disclosure (e.g., the technique described with respect to FIG. 2). In particular, at least one of rotor discs 36 and/or at least one of stator discs 38 may be formed from carbon-carbon composite component produced via one or more of the example techniques of this disclosure. Rotor discs 36 and stator discs 38 may be formed of the same materials or different materials. For example, wheel assembly 10 may include metal rotor discs 36 and carbon-carbon composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, in some examples, rotor discs 36 and stator discs 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. Splines 44 may, for example, be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10.

The example assembly 10 shown in FIG. 1 is merely one example. In other examples, assembly 10 and the components of assembly 10 (e.g., wheel 10, actuator assembly 14, brake stack 16, and axle 18) may have another suitable configuration. In addition, in other examples, the carbon-carbon composite components described herein resulting from example carbon fiber preforms may be used to form other structures in addition to, or instead of, one or more of discs 36, 38, keys 40, and spline 44.

FIG. 2 is a conceptual diagram illustrating example carbon-carbon composite component 50 in accordance with aspects of the disclosure. As shown, carbon-carbon composite component 50 is an annular ring with an inner diameter (ID), outer diameter (OD), and a thickness (T) in the z-axis direction (orthogonal x-y-z axes are shown in FIG. 2 for ease of description). Carbon-carbon composite component 50 is formed of composite material 52, and includes a plurality of individual layers (not shown in FIG. 2) formed by depositing carbon fibers and resin material, as described further below, on a layer-by-layer basis followed by carbonization of the resin via a carbonizer using a three-dimensional printing process. For ease of illustration, composite material 52 will be described primarily as carbon fibers and carbonized matrix material (e.g., resin that has undergone carbonization).

FIG. 3 is a schematic diagram illustrating an example multilayered carbon-carbon composite component 50 taking along cross-section A-A indicated in FIG. 2. As shown, carbon-carbon composite component 50 includes a plurality of individual composite layers $54X_1$, $54X_2$, $54X_3$, $54X_4$, . . . and $54X_n$, where n is the total number of individual layers in the z-axis direction. The layers will be collectively referred to as composite layers 54. Together, composite layers 54 define the thickness, T, of carbon-carbon composite component 50 in the z-axis direction. Each individual layer of composite layers 54 is formed of plurality of carbon fibers 53 and carbonized matrix material 55. The thickness of the individual layers of composite layers 54 may be dependent on the design and application intent of the carbon-carbon composite component 50. In some examples, the thickness of the individual layers of composite layers 54 may be between approximately 25 mils (approximately 0.635 millimeters (mm)) and approximately 125 mils (approximately 3.175 mm), although other thicknesses are contemplated. In some examples, the overall thickness, T, of carbon-carbon composite component 50 may be between approximately 0.5 inches (approximately 1.27 centimeters (cm)) to approximately 2.5 inches (approximately 6.35 cm), although other thicknesses are contemplated. While FIG. 3 depicts each layer of composite layers 54 as substantially planar (e.g., planar or nearly planar in shape), other forms are also contemplated. For example, composite layers 54 may take on a rippled or corrugated shape, which may provide further resistance against delamination of the individual layers of composite layers 54.

As described further below, composite material 52 may include plurality of carbon fibers 53 and carbonized matrix material 55. In some examples, carbon fibers 53 may be formed via a three-dimensional printing system using, for example, carbon fibers or filaments, carbon fiber material, or a carbon fiber precursor material (collectively referred to as "carbon fibers"). Example materials used to form carbon fibers 53 include, for example, polyacrylonitrile (PAN) fibers, pitch fibers, oxidized PAN, carbon fiber derived from PAN, carbon fiber derived from pitch, rayon, and the like. In the case of using carbon fiber precursor material, the precursor may be easily converted to carbon fibers 53 through carbonization via a carbonizer as described further below.

Carbon fibers 53 may provide structural strength for the finished carbon-carbon composite component 50. In some examples, carbon fibers 53 may be a single filaments or fiber tows. The length of carbon fibers 53 included in a respective layer of composite layers 54 can vary from individual fibers with a length of about 0.1 inches to a substantially continuous (e.g., continuous or nearly continuous) fibers throughout the layer. Each fiber of carbon fibers 53 may in some examples may be defied by one or more filaments having a filament diameter less than or equal to about 20 microns. In some examples, the length of the fibers may be varied along the thickness, T, of carbon-carbon composite component 50. For example, carbon fibers 53 near an outer surface of carbon-carbon composite component 50 (e.g., layers $54X_1$ and $54X_N$) may each have a length of approximately 0.25 inches (approximately 6.35 mm) while carbon fibers 53 near the geometric middle of carbon-carbon composite component 50 may have a length of up to approximately 3 inches (approximately 7.62 cm).

In some examples, carbon fibers 53 of composite layers 54 may be in the form of prefabricated sheets of carbon fibers. For example, carbon fibers 53 may be in the form of a fabric sheet formed of woven or nonwoven carbon fibers or precursor carbon fibers, such as polyacrylonitrile (PAN) or rayon, which may be converted into carbon fibers 53 thorough carbonization as describe below. In some examples, a single sheet of carbon fibers 53 may have a thickness of about 0.125 inches. Depending of the intended application for the final product, the sheet of carbon fibers 53 may be cut to a specific shape including, for example, a disc brake having a desired internal diameter and outer diameter, or other structural features for attachment purposes. A single sheet of carbon fibers 53 may have a fiber volume density of about 900 to about 1000 g of fibers per square meter. The fibers may be continuous or segmented depending on design specifics of the product.

Any suitable resin used to form carbonized matrix material 55 of carbon-carbon composite component 50 may be used. For example, the resin may include, but is not limited to, a synthetic, a coal tar, a petroleum isotropic and mesophase pitch, a phenolic resin, an epoxy resin, other carbon yielding resins, or combinations thereof. In some examples, the resin used to form carbonized matrix material 55 may include pitch, such as a hydrocarbon-rich pitch that may be extracted, e.g., from coal, tar, and petroleum. In some examples, the resin may be synthetically produced. In some examples, the resin may come from a single source (e.g., coal) or may be a combination of different resins from different sources. In some examples, the resin may be a mesophase pitch. In other examples, the resin may be an isotropic pitch. Combinations of mesophase and isotropic pitches are also contemplated. The resin may be converted to carbonized matrix material 55 via a carbonizer of a three-dimensional printing system.

Composite material 52 of carbon-carbon composite component 50 may include any suitable amounts of carbon fibers 53 and carbonized matrix material 55, e.g., amounts that allows for composite material 52 to function for a desired application, e.g., the disk brakes of an aircraft. In some examples, composite material 52 may include approximately 45 to approximately 85 weight percent (wt %) of carbon fibers 53, such as, e.g., approximately 50 to approximately 80 wt %, approximately 80 to approximately 85 wt %, or approximately 45 to approximately 50 wt %. Composite material 52 may include approximately 15 to approximately 55 wt % of carbonized matrix material 55, such as, e.g., approximately 20 to approximately 50 wt %, approximately 15 to approximately 20 wt %, or approximately 50 to approximately 55 wt % of carbonized matrix material 55, where the balance of the carbon-carbon composite component 50 may comprise, consist of, or consist essentially of carbon fibers 53. In some examples, carbon fibers 53 and carbonized matrix material 55 may be present in a ratio of approximately 50/50 carbon fibers 53 to carbonized matrix material 55. In some examples, composite material 52 may comprise, consist, or consist essentially of carbon fibers 53 and carbonized matrix material 55. In some examples, increasing the amount of carbon fibers 53 may provide for a stronger carbon-carbon composite component 50, while increasing the amount of resin used to form carbonized matrix material 55 may provide for a denser carbon-carbon composite component 50.

In some examples, composite layers 54 may be formed from a plurality of rows formed via a three-dimensional printing system. For example, FIG. 4 is a schematic diagram illustrating an example cross-section of layer 54X₄ of carbon-carbon composite component 50 in the x-direction, which may be representative of the configuration of each of the respective layers of composite layers 54. As shown, layer 54X₄ includes a plurality of individual composite rows 56X₁, 56X₂, 56X₃, 56X₄, . . . and 56X_y (collectively hereinafter "composite rows 56") aligned side-by-side in the x-axis direction, where y is the total number of individual rows in the x-axis direction. Again, each individual row of composite rows 56 is formed of a plurality of carbon fibers 53 and carbonized matrix material 55 using a three-dimensional printing system. Composite rows 56 combine to form layer 54X₄ in the x-y plane that also includes a layer thickness in the z-axis direction.

Composite rows 56 may be deposited in any suitable configuration to form layer 54X₄ in the x-y plane. For example, composite rows 56 may be linear rows formed in a grid pattern, concentric circles e.g., from the ID to the OD of carbon-carbon composite component 50, or in a coiled pattern, e.g., from the ID to the OD of carbon-carbon composite component 50, which may allow for the continuous deposition and carbonization of composite material 52 compared to a pattern of concentric circles. The individual composite rows 56 may have any suitable width and cross-sectional shape, both of which may depend on the design of the three-dimensional print head and may be selected based on the design intent of the carbon-carbon composite component 50 formed from by the process. In some examples, composite rows 56 may be a substantially circular, oval, rectangular, triangular or other suitably shaped cross-section and may have a width of approximately 5/16 of an inch (approximately 7.9375 millimeters (mm)) to approximately ⅛ of an inch (approximately 3.175 mm).

Each individual layer of composite layers 54 and individual row of composite rows 56 making up carbon-carbon composite component 50 may be formed via any suitable three-dimensional printing process. In some examples, during the three-dimensional printing process, composite layers 54 and composite rows 56 are iteratively formed in three-dimensions to generate carbon-carbon composite component 50 with a desired geometry such as the annular ring with a thickness (T) shown in FIG. 2. In some examples, carbon-carbon composite component 50 may have an inner diameter (ID) of about 4 inches (about 10.16 cm) to about 18 inches (about 45.72 cm), and outer diameter (OD) of about 10 inches (about 25.4 cm) to 30 inches (about 76.2 cm), and a thickness (T) of about 0.5 inches (about 1.27 cm) to about 2.5 inches (about 6.35 cm). Other ranges and geometries are contemplated.

Figure 5:
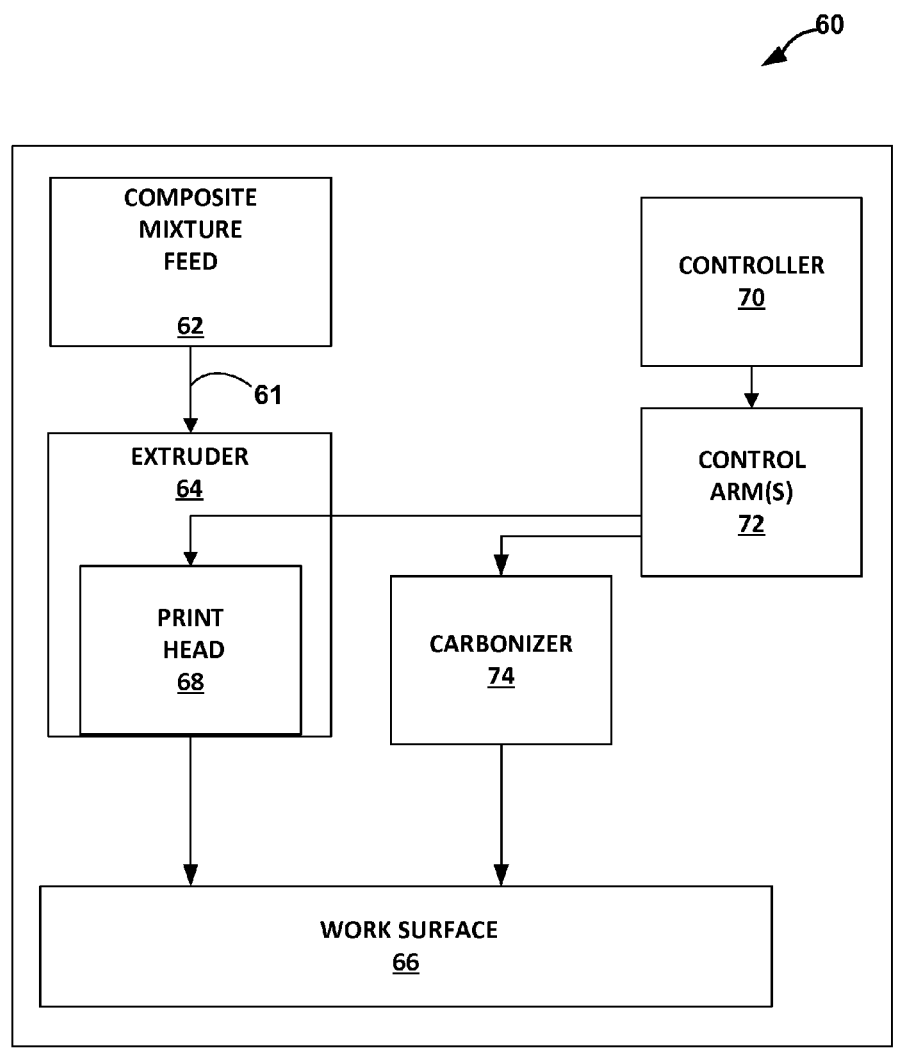
FIGS. 5-6 are schematic diagrams illustrating example three-dimensional printing systems used to form a carbon-carbon composite component via a three-dimensional printing process.

While described with respect to the three-dimensional printing systems discussed below, any suitable three-dimensional printing system configured to deposit a resin on carbon fibers followed by carbonization of the resin to form carbonized matrix material 55 of carbon-carbon composite component 50 using three-dimensional printing techniques may be used. FIG. 5 is a schematic diagram illustrating an example three-dimensional printing system 60 which may be used in the context of this disclosure to form carbon-carbon composite component 50 via a three-dimensional printing process. For ease of description, system 60 is described in terms of an extrusion deposition system. However, other systems for forming carbon-carbon composite component 50 are also contemplated.

As shown, system 60 includes a composite mixture feed 62, which delivers a composite mixture 61 containing carbon fibers (e.g., carbon fibers or carbon fiber precursor) mixed with resin in bulk form to extruder 64. Extruder 64 includes a printer head 68 configured to deposit composite mixture 61 on work surface 66. System 60 may also include a controller 70 and one or more control arms 72. Controller 70 may be configured to operably control one of more control arms 72 to facilitate deposition and carbonization of composite mixture 61. One or more control arms 72 may be configure mechanically position print head 68 and carbonizer 74 relative to work surface 66, by controlling the position in three-dimensional space of printer head 68, carbonizer 74, and/or work surface 66. System 60 may also include carbonizer 74, which may be configured to heat localized sections (e.g., relatively small sections of material defined by the area of a concentrated laser beam) of deposited composite mixture 61 on work surface 66 to induce carbonization of the resin and, if needed, the carbon fibers.

In some examples, composite mixture 62 may be in the form of prefabricated pellets or a coiled ring of prefabricated composite mixture 61. Composite mixture 61 may be heated by extruder 64 to a temperature that melts composite mixture 61 (e.g., to a liquid state or otherwise softens composite mixture 61) in a manner that allows the heated material to flow out of one or more outlets define by moveable printer head 68. The composite mixture 61 flowing out of printer head 68 may be deposited either directly on work surface 66 or indirectly on work surface 66 (e.g., deposited onto one or more of composite layers 54 previously formed). Deposited composite mixture 61 may be subsequently heated via carbonizer 74 to induce carbonization of the resin (and in some cases carbonization of the carbon fibers) in composite mixture 61 to produce carbonized matrix material 55 of composite material 52. The process may be repeated by adjusting the position of print head 68 and carbonizer 74 in three-dimensions relative to work surface 66, which supports the deposited layers throughout the three-dimensional printing process. Composite mixture 61 may be deposited via print head 68 and carbonized via carbonizer 74 on a continuous or discontinuous basis during the printing process. In some examples, the melting and extrusion steps may be carried out in a cross head extrusion system. Carbonization via carbonizer 74 of the deposited composite mixture 61 may take place in conjunction with being deposited via print head 68 (e.g., print head 68 and carbonizer 74 are connected to the same movable apparatus) or take place independently of composite mixture 61 being deposited via print head 68 (e.g., print head 68 and carbonizer 74 are operated by independent control arms 72).

In the example illustrated in FIG. 5, system 60 includes controller 70, which may control operation of system 60 during the three-dimensional printing process to provide carbon-carbon composite component 50 with a desired geometry. For example, during deposition, controller 70 may control the movement of one or more control arms 72, which may be attached to moveable print head 68 and carbonizer 74, to control the deposition of composite mixture 61 relative to work surface 66 and the carbonization of composite mixture 61 via carbonizer 74. In this manner, controller 70 may control the relative position in three-dimensional space of composite mixture 61 exiting out of print head 68 on to work surface 66. After depositing composite mixture 61, controller 70 may control the relative position in three-dimensional space of carbonizer 74 to induce carbonization of the resin and, if needed the carbon fibers included in composite mixture 61 for form composite material 52 of carbon-carbon composite component 50, e.g., by depositing and carbonizing composite rows 56 and composite layers 54. Stepper motors or servo motors may be employed to move print head 68 and carbonizer 74 as wells to adjust the flow of composite mixture 61 out of print head 68. Controller 70 may be configured to control the position of one or more controller arms 72 in order to move print head 68 and carbonizer 74 either collectively or independently in the x-axis, y-axis, and z-axis direction. Additionally, controller 70 may control one or more other factors of the additive deposition process, such as, e.g., temperature of composite mixture feed 62 and/or composite mixture 61 at one more locations within system 60, the timing of the feed from composite mixture feed 62 to extruder 64, the position of print head 68 and/or flow rate of composite mixture 61 out of print head 68, three-dimensional position of carbonizer 74, the temperature and operation of carbonizer 74, as well as other features of system 60.

In some examples, controller 70 may include a microprocessor or multiple microprocessors capable of executing and/or outputting command signals in response to received and/or stored data. Controller 70 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller 70 may include computer-readable storage, such as read-only memories (ROM), random-access memories (RAM), and/or flash memories, or any other components for running an application and processing data for controlling operations associated with system 60. Thus, in some examples, controller 70 may include instructions and/or data stored as hardware, software, and/or firmware within the one or more memories, storage devices, and/or microprocessors. In some examples, controller may control print head 68 and carbonizer 74 using a computer-aided manufacturing (CAM) software package running on a microcontroller. Controller 60 may include multiple controllers or only a single controller.

System 60 also includes carbonizer 74. The term carbonizer is used to describe a device configured to heat a localized area (e.g., a relatively small area of material of about 0.01 mm to about 1 mm in diameter to a relatively large area of material including about 1 mm to about 10 mm in diameter) of deposited composite mixture 61 on work surface 66 to induce carbonization of the resin, and in some cases, carbonize the carbon fibers (e.g., carbon fiber precursor material), contained in the deposited composite mixture 61. Heating the resin above its carbonization temperature (e.g., above 450° C.) causes the resin to undergo a pyrolytic reaction wherein the molecular bonds of the resin begin to break releasing material (e.g., organic material such as hydrogen and oxygen) as gases and leaving behind a substantially pure carbon structure (e.g., char). The remaining carbon helps densify and improve the durability of the resulting carbon-carbon composite component 50. In some examples, the carbonization process may be conducted in a substantially oxygen free environment so as to avoid any unwanted side oxidation reactions. In such examples, system 60 may be contained, for example, in an oxygen free environment (e.g., vacuum or nitrogen environment) or configured so that system 60 generates an oxygen free environment over work surface 66 during the carbonization process (e.g., by establishing a vacuum or blanketing work surface 66 with an inert gas.

In some examples, the carbonizer 74 used in system 60 may be in the form of a focused plasma torch configured to deliver heat (e.g., spot heat an area of about 0.1 mm to about 10 mm to a temperature in excess of about 450° C. (e.g., above the carbonization temperature of the resin 600° C.)) to a localized area of the deposited composite mixture 61 to rapidly elevate the temperature of the localized area of composite material 61 to carbonize the resin and convert the resin to carbonized matrix material. In some examples, the time it takes carbonizer 74 (e.g. plasma torch) to heat and carbonize a localize area of resin can be nearly instantaneous, for example, achieving carbonization in less than 2 seconds. Any suitable plasma torch may be used as carbonizer 74 provided that the carrier gas is selected to be non-oxidizing (e.g., nitrogen, argon, or the like) to avoid unwanted oxidation of the resultant composite material 52. Once carbonizer 74 coverts the localized area of resin to carbonized matrix material 55, controller 70 may operate one or more control arms 72 to move carbonizer 74 relative to work surface 66 to continue the carbonization process until carbonizer 74 coverts the entire layer of resin to carbonized matrix material 55. In some examples, carbonizer 74 may also be configured to carbonize other materials included in composite mixture 61 including, for example, any precursor carbon fiber material used to form carbon fibers 53.

In some examples, the carbonizer 74 used in system 60 include may be a concentrated laser configured to deliver heat to a localized area of the deposited composite mixture 61 to rapidly elevate the temperature of the localized area of composite material 61 to carbonize the resin and convert the resin to carbonized matrix material. In some examples, the time it takes carbonizer 74 (e.g. concentrated laser) to heat and carbonize a localize area of resin can be nearly instantaneous, for example, achieving carbonization in less than 2 seconds. Concentrated lasers used as carbonizer 74 may include any type of lasers suitable for such application including, for example, $CO_2$ lasers, Ytterbium (Yb) lasers, Nd:YAG lasers, or the like. In some examples, the concentrated laser could be mounted adjacent on print head 68. In such examples, a recently deposited bead of material containing the resin from print head 68 could be carbonized via carbonizer 74 before depositing before depositing a subsequent bead of material. In other examples, the concentrated laser could be mounted elsewhere in system 60 with the light from the laser delivered adjacent to print head 68 using, for example, fiberoptics. Again, once carbonizer 74 coverts the localized area of resin to carbonized matrix material 55, controller 70 may operate one or more control arms 72 to move carbonizer 74 relative to work surface 66 to continue the carbonization process until carbonizer 74 coverts the entire layer of resin to carbonized matrix material 55.

In some examples, the carbonizer 74 used in system 60 include may an induction heat source, or other devices configured to deliver heat to a localized area of the deposited composite mixture 61 to rapidly elevate the temperature of the localized area of composite material 61 to carbonize the resin and convert the resin to carbonized matrix material. In some examples, the induction heat source may be applied to a larger area of deposited material (e.g., composite mixture 61) compared to using a carbonizer 74 in the form of a concentrated laser. In such examples that incorporate a carbonizer 74 in the form of an induction heat source, system 60 may be configured to deposit via print head 68 a larger area of localized composite material 61 (e.g., multiple beads or droplets of material creating a surface coverage of about 1 mm to about 10 mm or material) followed by carbonization of the larger area of composite material 61 containing resin. Again, once carbonizer 74 coverts the localized area of resin to carbonized matrix material 55, controller 70 may operate one or more control arms 72 to move carbonizer 74 relative to work surface 66 to continue the carbonization process until carbonizer 74 coverts the entire layer of resin to carbonized matrix material 55.

In some examples, carbonizer 74 may be located adjacent to print head 68. In such configurations, system 60 may be configured to perform an iterative resin (e.g., inclining materials containing resin such as composite mixture 61) deposition and carbonization process so that print head 68 deposits a relatively small amount of material (e.g., composite mixture 61) such as a droplet or bead of material, followed by nearly instantaneous carbonization of the recently deposited material via carbonizer 74 before print head 68 subsequently deposits an additional relatively small amount of material. In some examples, the subsequently deposited material may be deposited laterally adjacent (e.g., x-y plane of FIG. 3) to the previous deposited material so as to continue the forming in the x-y plane a layer of composite layers 54. In other examples, the subsequently deposited material may be deposited on (e.g., in the z-axis direction of FIG. 3) the previous deposited material so as to continue the forming in the z-axis direction a layer of composite layers 54 to contribute to the thickness of the layer.

In some examples, carbonizer 74 may be configured to carbonize more than one layer of composite layers 54 at a single time. For example, after print head 68 deposits more than one layer of composite mixture 61 on work surface 66, the parameters of carbonizer 74 (e.g., heating area, power/intensity, heating time) may be set to direct heat at the surface of the deposited layers for a longer period of time (e.g., several seconds to several minutes) to allow the directed heat to penetrate and carbonize the multiple layers of deposited material to from composite material 52.

Figure 6:
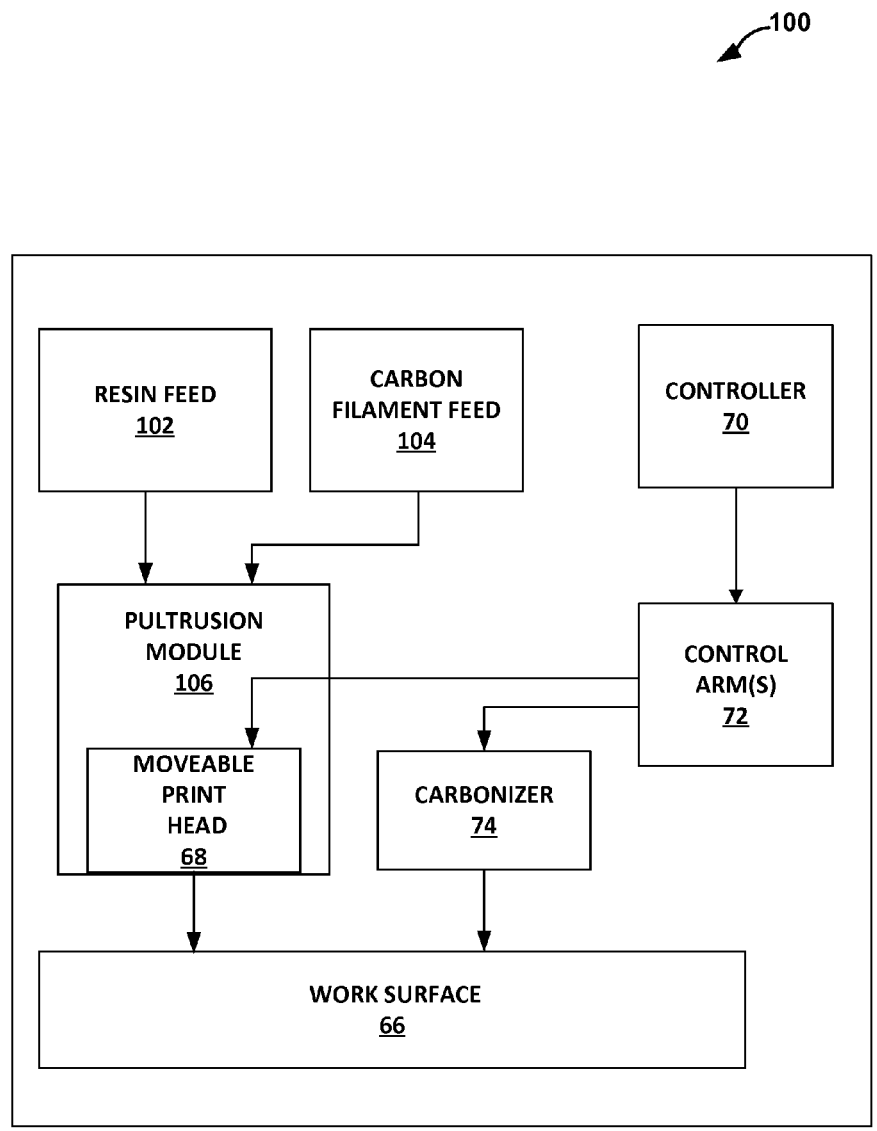

As described above, rather than depositing a composite mixture 61 via print head 68 of three-dimensional printing system 60, in some examples, three-dimensional printing system may be configured to deposit a plurality of individual carbon fibers 53 each coated with a resin and carbonize the resin via carbonizer 74 to form composite material 52. For example, FIG. 6 is a schematic diagram illustrating another example three-dimensional printing system 100 which may be used, for example, to form carbon-carbon composite component 50 by depositing a plurality of individual carbon filaments or precursor carbon filaments (collectively "carbon filament(s)"), where each carbon filament is coated with a resin. Three-dimensional printing system 100 includes at least one print head 68, work surface 66, carbonizer 74, controller 70, and one or more control arms 72, which function substantially the same or similar to that described with regard to system 60 (FIG. 4).

However, unlike that of system 60 (FIG. 4), system 100 includes resin feed 102, carbon filament feed 104, and pultrusion module 106. In such configurations, under the control of controller 70, system 100 may be configured to coat a substantially continuous (e.g., continuous or nearly continuous) carbon filaments from carbon filament feed 104 with resin from resin feed 102 using pultrusion module 106. Once coated, module 106 may cut the substantially continuous (e.g., continuous or nearly continuous) coated filaments into individual carbon filaments coated with resin, which may be deposited via at least one print head 68 directly or indirectly on work surface 66 to form layer of carbon filaments coated with resin. The substantially continuous (e.g., continuous or nearly continuous) coated carbon filaments may be cut by system 60 before or after exiting print head 68.

After being deposited on work surface 66, the carbon filaments coated with resin may be heated with carbonizer 74, substantially the same or similar fashion to that described with regard to system 60 (FIG. 4), to induce carbonization of the resin and in some cases carbonize the carbon filaments to form composite material 52.

Figure 7:
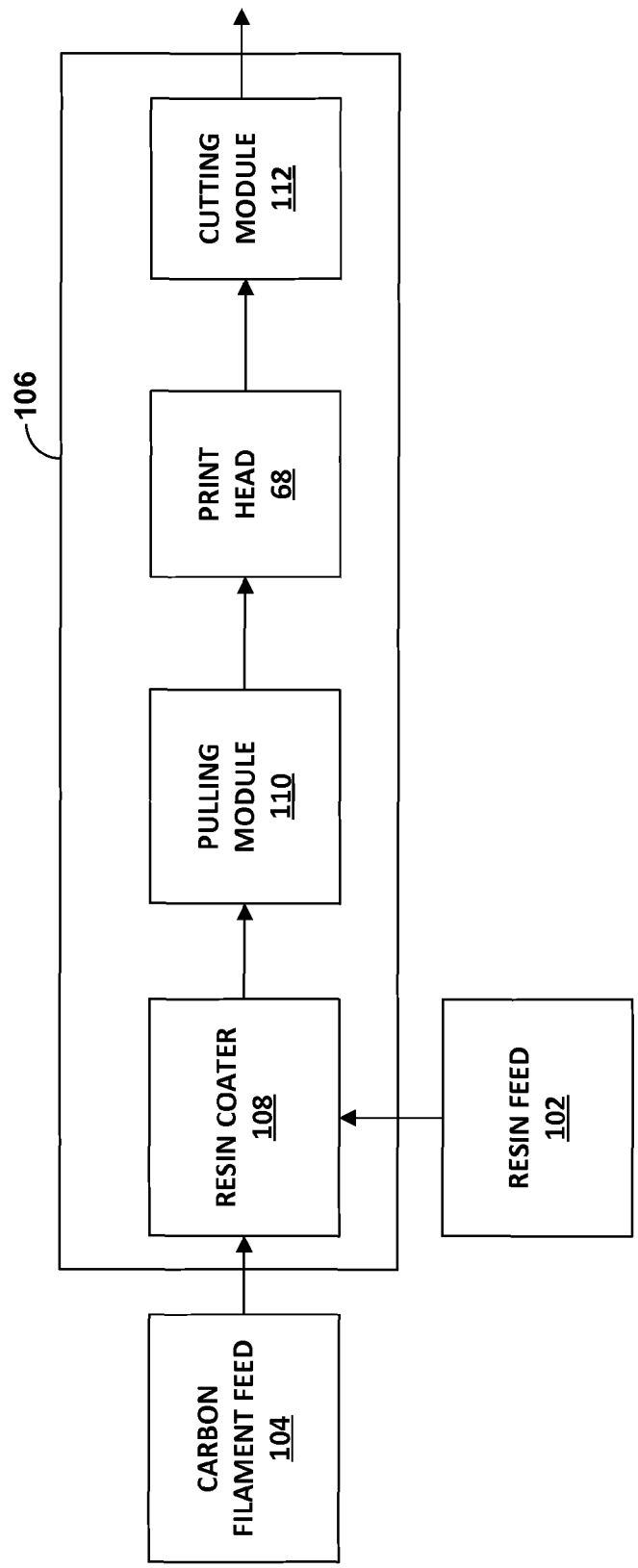
FIG. 7 is a schematic diagram illustrating an example pultrusion module that can be used with a three-dimensional printing system.

FIG. 7 is a schematic diagram illustrating various aspects of an example pultrusion module 106 as incorporated in system 100 to coat the carbon filaments with resin, which is then cut into individually coated carbon filaments. As shown, a substantially continuous (e.g., continuous or nearly continuous) carbon filament is fed from carbon filament feed 104 through resin coater 108. The substantially continuous (e.g., continuous or nearly continuous) carbon filament from carbon filament feed 104 may be, for example, an individual filament or a tow of carbon filaments, e.g., coiled on a roller. Rather than "pushing" the continuous carbon filament through resin coater 108, pulling module 110 "pulls" the carbon filament from the carbon filament feed 104 through resin coater 108. Pulling module 110 may employ one or more suitable mechanisms for pulling the carbon filament through resin coater 108, such as, e.g., caterpillar puller or reciprocating pullers.

While passing through resin coater 108, the continuous carbon filament is coated with resin supplied from resin feed 102. For example, resin coater 108 may to take the form of a resin bath filled with liquid resin from resin feed 102. Pulling module 110 pulls the continuous carbon filament from carbon filament feed 104 through the resin in the resin bath, e.g., to coat the outside of the filament with the resin. After exiting the resin coater 108, the substantially continuous (e.g., continuous or nearly continuous) carbon filament may have a coating of resin exhibiting any suitable thickness. The resin on the substantially continuous (e.g., continuous or nearly continuous) carbon filament may be cooled, e.g., via air quenching, to solidify or reduce the viscosity of the resin coating.

Subsequently, pulling module 110 feeds coated carbon filament to print head 68. Upon exiting print head 68, cutting module 112 cuts/chops the substantially continuous (e.g., continuous or nearly continuous) carbon filament into individual carbon filaments coated with resin, which are then deposited onto work surface 66 via print head 68 and then carbonized via carbonizer 74. Cutting module 112 can include any suitable carbon fiber cutting/chopping technique, such as, e.g., a fiber chopper with a cutting wheel. The individual carbon filaments may be cut to any suitable length. For example, the substantially continuous (e.g., continuous or nearly continuous) coated carbon filament may be cut into individually coated carbon filaments with a length of approximately ¹⁄₁₆ of an inch (approximately 1.5875 mm) to approximately 3 inches (approximately 7.62 cm), e.g., approximately ⅛ of an inch (approximately 3.175 mm) to approximately 3 inches (approximately 7.62 cm). The thickness of the coating relative the diameter of the carbon filament may be selected to provide for the compositional ranges of the resin and carbon filaments for the layers described above.

In the example described in FIG. 6, system 100 is configured to both coat a substantially continuous (e.g., continuous or nearly continuous) carbon filament and cut the filament into individual coated carbon filaments. In other examples, a three-dimensional printing may be configured to receive pre-coated, substantially continuous (e.g., continuous or nearly continuous) carbon filaments, which are then cut and subsequently deposited via print head 68. In other examples, the carbon filaments are both pre-coated and pre-cut before being fed into three-dimensional printing system 100 for deposition via print head 68 and subsequent carbonization via carbonizer 74.

Figure 8:
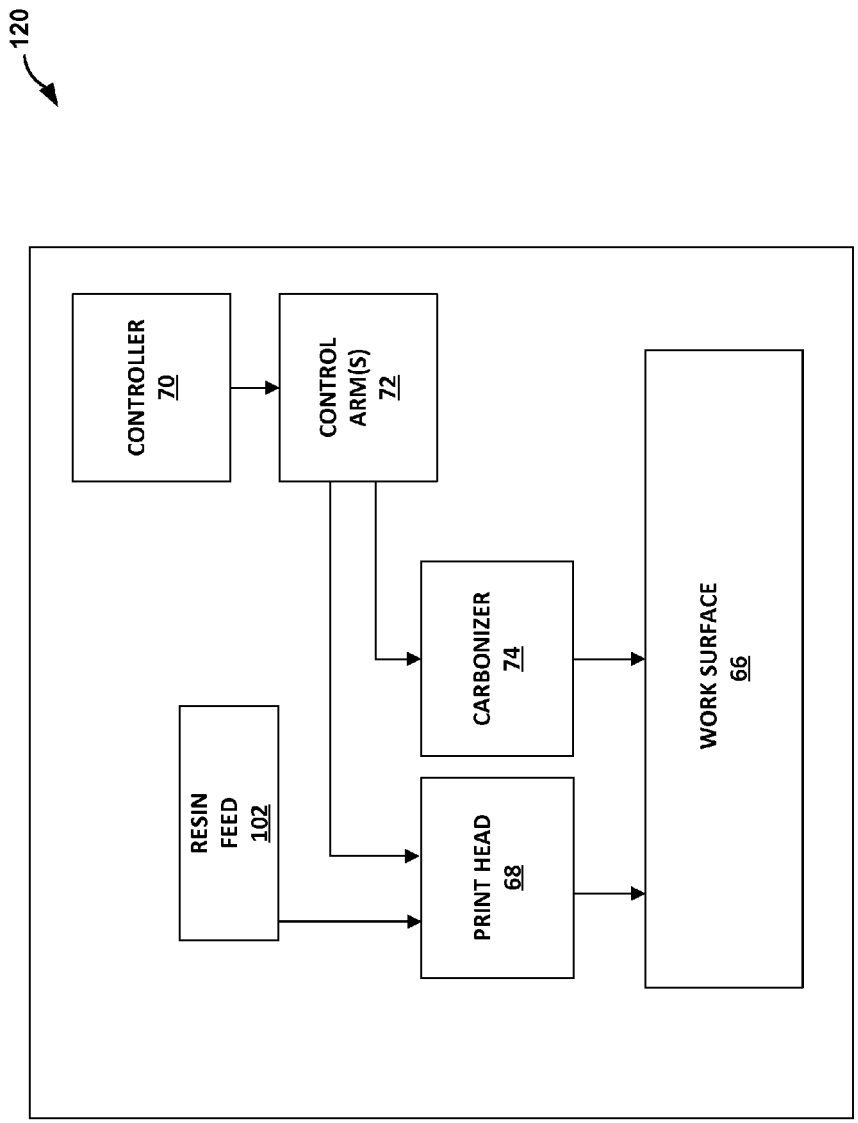
FIG. 8 is schematic diagram illustrating an example three-dimensional printing system used to form a carbon-carbon composite component via a three-dimensional printing process.

In some examples, carbon fibers 53 may be deposited on work surface 66 independently of the resin used to form carbonized matrix material 55. For example, FIG. 8 is a schematic diagram illustrating an example three dimensional printing system 120 that may be used to initially form a layer of carbon fibers 53 follow by the subsequent deposition and carbonization of a resin on the initially formed carbon fibers 53. The process may be repeated to form carbon-carbon composite component 50 having the desired geometry.

In some examples carbon fibers 53 used to form composite layers 54 may be formed as prefabricated sheets as described above. In such examples, after a sheet of the carbon fibers used to form an individual layer of composite layers 54 is added to work surface 66 (e.g., directly or indirectly added to work surface 66), the sheet may be densified by depositing a resin from resin feed 102 via print head 68 on to the sheet of carbon fibers followed by carbonization of the resin, and if needed carbonization of the carbon fibers via carbonizer 74.

In some examples, printing system 120 may be configured to also form the layers of the carbon fibers prior to being densified with resin. In this way, composite layers 54 of composite material 52 may be formed through a multistage process of first depositing a carbon fiber material on work surface 66 via at least one print head of system 120 configured to deposit the carbon fiber material (not shown in FIG. 8.). For example, system 120 can include a carbon fiber material feed so that carbon fiber material may be deposited either directly on work surface 66, e.g., forming a first layer of carbon fiber material, or indirectly on work surface 66, e.g., where the deposited layer of carbon fiber material is formed on previously formed composite layers 54 of composite material 52. By forming the additional layer of carbon fibers with the three-dimensional printing system 120, z-axis fibers (e.g., fibers extending in the z-axis direction of FIG. 3), may be formed to allow connections between the adjacent composite layers 54, which can provide increased strength of the of the resulting carbon-carbon composite component, thereby reducing the chance of the layers delaminating. After deposition of the carbon fiber material, controller 70 can operate resin feed 102 and print head 68 to deposit resin on the recently deposited carbon fiber material. Carbonizer 74 can then be engaged to carbonize the recently deposited resin to form carbonized matrix material 55 of composite layers 54. In some examples, if needed, carbonizer 74 may also carbonize the carbon fiber material to convert any carbon fiber precursor materials to carbon fibers 53.

In some examples, each newly added layer or sheet of carbon fibers may be substantially planar, e.g. planar or nearly planer. In other examples the added layers of carbon fibers (72) may be non-planer, e.g., rippled or corrugated layers of carbon fibers. The non-planar layers of carbon fibers may provide added resistance against layer delamination, particularly when the additional layer of carbon fibers includes a prefabricated sheet as discussed above.

As shown in FIG. 8, system 120 includes resin feed 102 which feeds resin material to at least one print head 68, which deposits the resin on work surface 66. After the resin is deposited on work surface 66, the resin may be carbonized via carbonizer 74 to convert the resin carbonized matrix material 55 in a similar fashion to the techniques described above with respect to system 60. In some examples, the resin material may be in the form of prefabricated pellets or a coiled ring of resin material. Resin feed 102 may then heat the resin material to a temperature that melts the resin material or otherwise softens the resin material in a manner that allows the heated material to flow out of one or more outlets defined by print head 68. For example, print head 68 may include a die defining one or more apertures through which the resin material is forced out of during the three-dimensional printing process (e.g., by applying a pressure). The one or more apertures of the die of print head 68 may have a geometry that allows for the printed resin material to have a desired cross-section upon being forced out of print head 68, e.g., via an extrusion process.

The resin material flowing out of print head 68 may be directed towards work surface 66 where, for example, a layer of carbon fibers may be positioned during the resin deposition process. The resin material flowing out of print head 68 may be directed to a desired position relative the layer of carbon fibers to infiltrate and densify the layer of carbon fibers in the desired manner using the deposited resin material. The resin material may be deposited via at least one print head 68 on a continuous or discontinuous basis during the three-dimensional printing process, and the position of print head 68 in the three-dimensional space relative a layer of carbon fibers on work surface 66 may be adjust on a continuous or discontinuous basis using one or more control arms 72.

In some examples, the deposited resin material may be allowed to cool and solidify prior to undergoing carbonization via carbonizer 74. In such examples, the three dimensional positioning of print and 68 and carbonizer 74 relative to work surface 66 may be operated independently by one or more control arms 72. In other examples, the deposited resin material may be carbonized immediately following being deposited on the layer of carbon fibers. In such examples, the three dimensional positioning of print and 68 and carbonizer 74 may be positioned adjacent to one another (e.g., on the same moveable platform) and operated using the same one or more control arms 72.

The systems describe with respect to FIGS. 5-8 are only some examples of a three-dimensional printing system that may be used to deposit carbon fibers (e.g., carbon fibers, carbon fiber material, or carbon fiber precursor material) and a resin on a work surface and subsequently carbonize the resin and, if needed, carbonize the carbon fibers to form multilayered carbon-carbon composite component 50 of composite material 52. Other systems or combinations of systems for forming the layers of composite material 52 in accordance with examples of the disclosure are also contemplated. For example, U.S. patent application Ser. No. 14/711,550 (Fryska et al.) filed on May 13, 2015, entitled "Carbon Fiber Preforms," the entire disclosure of which is incorporated herein by reference, describes examples of forming layers of carbon fibers and resin using a three-dimensional printer that can be used with the techniques described herein, U.S. patent application Ser. No. 14/711,426 (Troester et al.), filed on May 13, 2015, entitled "Carbon Fiber Preforms," the entire disclosure of which is incorporated herein by reference, describes forming layers of carbon fibers using a three-dimensional printer that can be used with the techniques described herein, U.S. patent application Ser. No. 14/711,590 (Troester et al.) filed on May 13, 2015 entitled "Multilayered Carbon-Carbon Composite," the entire disclosure of which is incorporated herein by reference, describes examples of forming layers of carbon fibers and resin using a three-dimensional printer that can be used with the techniques described herein, U.S. patent application Ser. No. 14/788,217 (La Forest et al.) filed on May 13, 2015 entitled "Carbon Fiber Preforms," the entire disclosure of which is incorporated herein by reference, describes examples of forming layers of carbon fibers and resin using a three-dimensional printer that can be used with the techniques described herein, and U.S. patent application Ser. No. 14/711,508 (Fryska et al.) filed on May 13, 2015 entitled "Carbon Fiber Preforms," the entire disclosure of which is incorporated herein by reference, describes examples of forming layers of carbon fibers using a three-dimensional printer that can be used with the techniques described herein.

Figure 9:
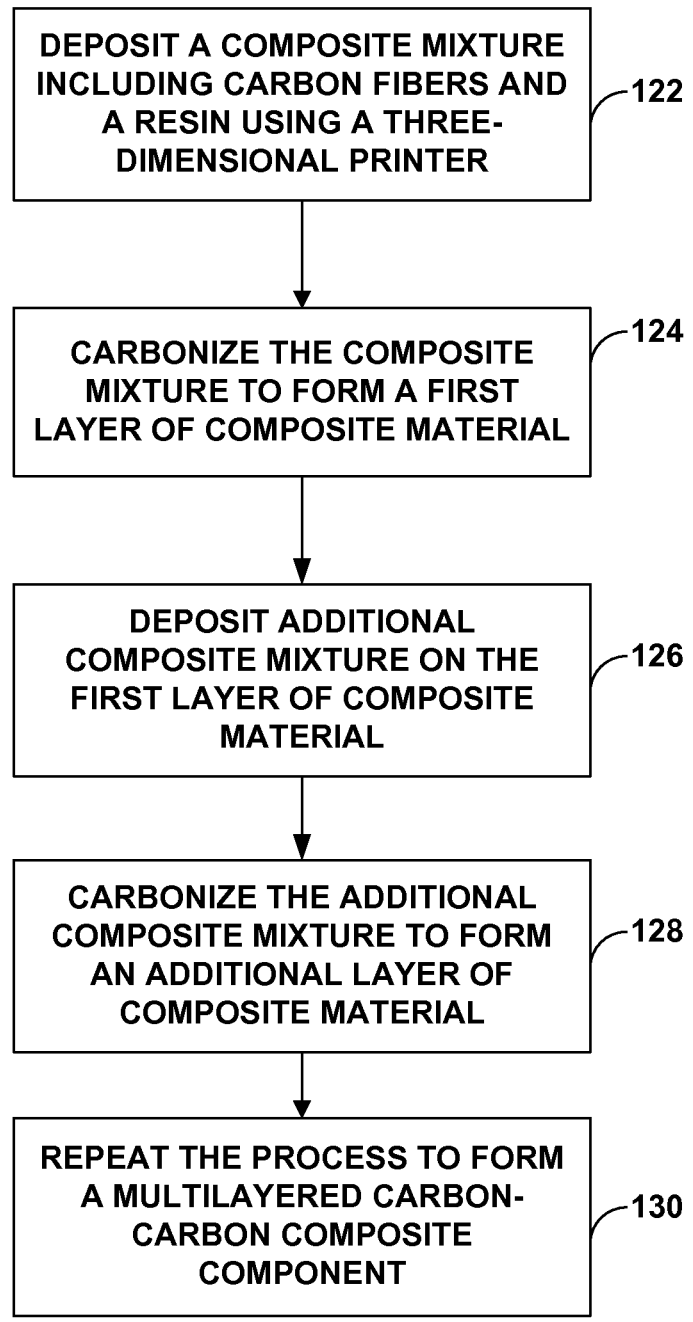
FIG. 9 is a flow diagram illustrating an example technique of forming a carbon-carbon composite by depositing layers of composite material and carbonizing the composite material using a three-dimensional printing system.

FIG. 9 is a flow diagram illustrating an example technique of forming a carbon-carbon composite by depositing layers of composite material and carbonizing the composite material using a three-dimensional printing system in accordance with aspects of the disclosure. For ease of illustration, the example technique of FIG. 9 is described as being performed via print system 60 of FIG. 5; however, other systems suitable for carrying out the three-dimensional printing to form the carbon-carbon composite are contemplated.

As shown, controller 70 of system 60 may control the operation of composite mixture feed 62, extruder 64, and at least one print head 68 to deposit a composite mixture 61 including carbon fibers mixed with a resin on work surface 66 (122). After depositing composite mixture 61, controller 70 may control carbonizer 74 to induce carbonization of the resin, and in some cases carbon fibers, of composite mixture 61 to form a first layer (e.g., layer $54X_1$) of composite material 52 including carbon fibers 53 and carbonized matrix material 55 (124). Throughout the process, controller 70 may control the position of print head 68 and carbonizer 74 via one or more control arms 72 to form the resulting layer of composite material 52.

After forming the first layer of composite material, controller 70 may reengage composite mixture feed 62, extruder 64, and at least one print head 68 to deposit an additional layer composite mixture 61 on the first layer of composite material 52 (126). Controller 70 may then again control carbonizer 74 to induce carbonization of the recently deposited resin, and in some cases carbon fibers, of the additional layer of composite mixture 61 to form an additional layer (e.g., layer $54X_2$) of composite material 52 including carbon fibers 53 and carbonized matrix material 55 (128). Steps (126) and (128) may be repeated as many times as desired to produce a multilayered carbon-carbon composite component 50 having a desired geometry (130).

Figure 10:
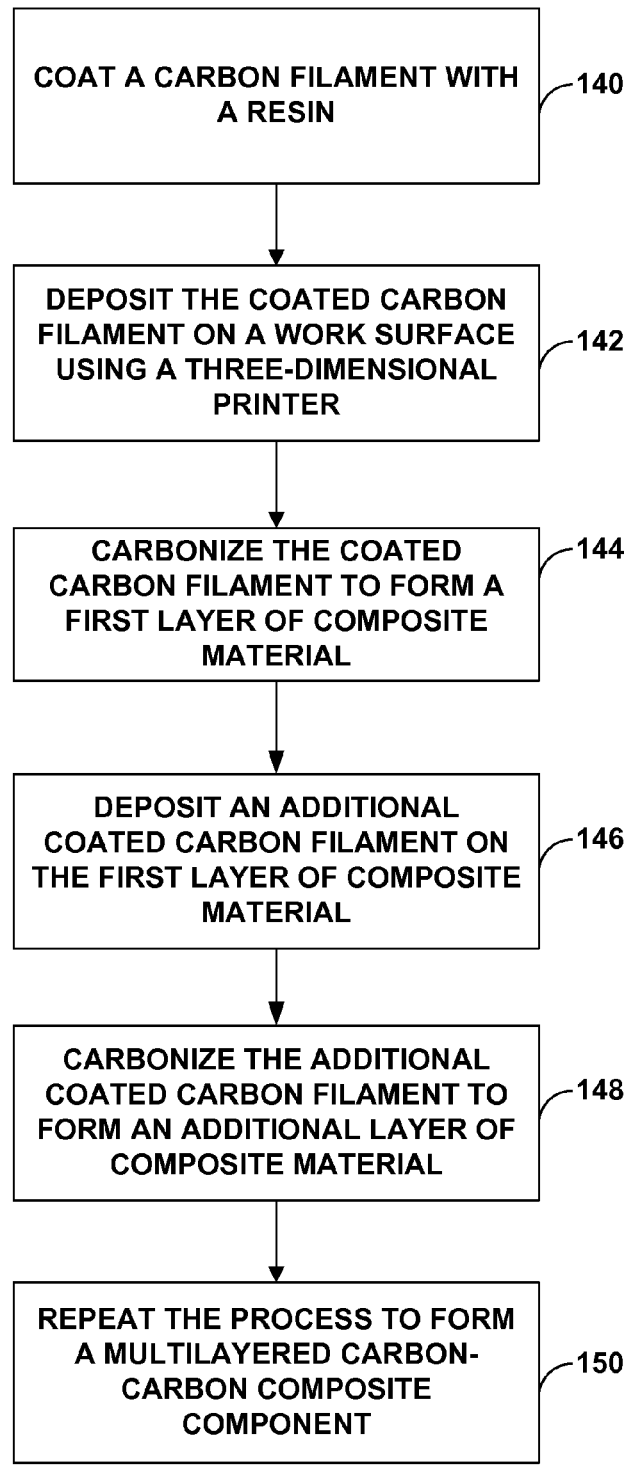
FIG. 10 is flow diagram illustrating an example technique of forming carbon-carbon composite component by depositing and carbonizing carbon filaments coated with resin to from multiple composite layers of composite material using a three-dimensional printing system.

FIG. 10 is flow diagram illustrating another example technique of forming carbon-carbon composite component 50 by depositing and carbonizing carbon filaments coated with resin to from multiple composite layers 54 of composite material 52 using a three-dimensional printing system in accordance with aspects of the disclosure. For ease of illustration, the example technique of FIG. 10 is described as being performed via print system 100 of FIGS. 6 and 7; however, other systems suitable for carrying out the three-dimensional printing to form the carbon-carbon composite are contemplated.

As shown, controller 70 of system 100 may, in some examples, control the operation of resin feed 102, carbon filament feed 104, and pultrusion module 106 to coat a substantially continuous (e.g., continuous or nearly continuous) carbon filament with a resin (140). As described above, the carbon filaments may be coated with the resin using any relevant means. FIG. 7 illustrates an example pultrusion module 106 that may be configured to coat the carbon filaments with resin as described above, which are then cut into individually coated carbon filaments. In such examples, the carbon filaments may be fed from carbon filament feed 104 through resin coater 108. Rather than "pushing" the continuous carbon filaments through resin coater 108, pulling module 110 "pulls" the carbon filaments from the carbon filament feed 104 through resin coater 108, which bathes the carbon filaments in a resin bath filled with liquid resin from resin feed 102. After exiting the resin coater 108, the carbon filaments may have a coating of resin exhibiting any suitable thickness. As described above, in some examples, the carbon filaments may be acquired pre-coated with a resin, thus bypassing the need to coat the carbon filaments (140) prior to depositing the coated carbon filaments on work surface 66 (142).

Once the coated carbon filaments are prepared, the coated carbon filaments may then be fed via, for example, pulling module 110 to print head 68 where the coated carbon filaments are deposited on work surface 66 (142). In some examples, the coated carbon filaments may be cut into a plurality of coated carbon filaments prior to or as the coated carbon filaments are deposited on work surface 66 (142). After deposition of the coated carbon filaments on work surface 66 (142), controller 70 may control carbonizer 74 to induce carbonization of the deposited coated carbon filaments to convert the resin to carbonized matrix material 55 and, if needed, carbonize the carbon filaments to form carbon fibers 53 (144), thereby forming a first layer of composite material 52 (e.g., layer $54X_1$). Again, throughout the process, controller 70 may control the position of print head 68 and carbonizer 74 via one or more control arms 72 to form the resulting layer of composite material 52.

Next, controller 70 can operate print head 68 to deposit additional coated carbon filaments in the form, for example, of a layer of coated carbon filaments on the first layer of composite material 52 (146). The recently deposited coated carbon filaments may then be carbonized via carbonizer 74 as described above to form an additional layer of composite material 52 (e.g., layer 54X$_2$) on the first layer of composite material 52 (148). Steps (146) and (148) may be repeated as many times as desired to produce a multilayered carbon-carbon composite component 50 having a desired geometry (150).

Figure 11:
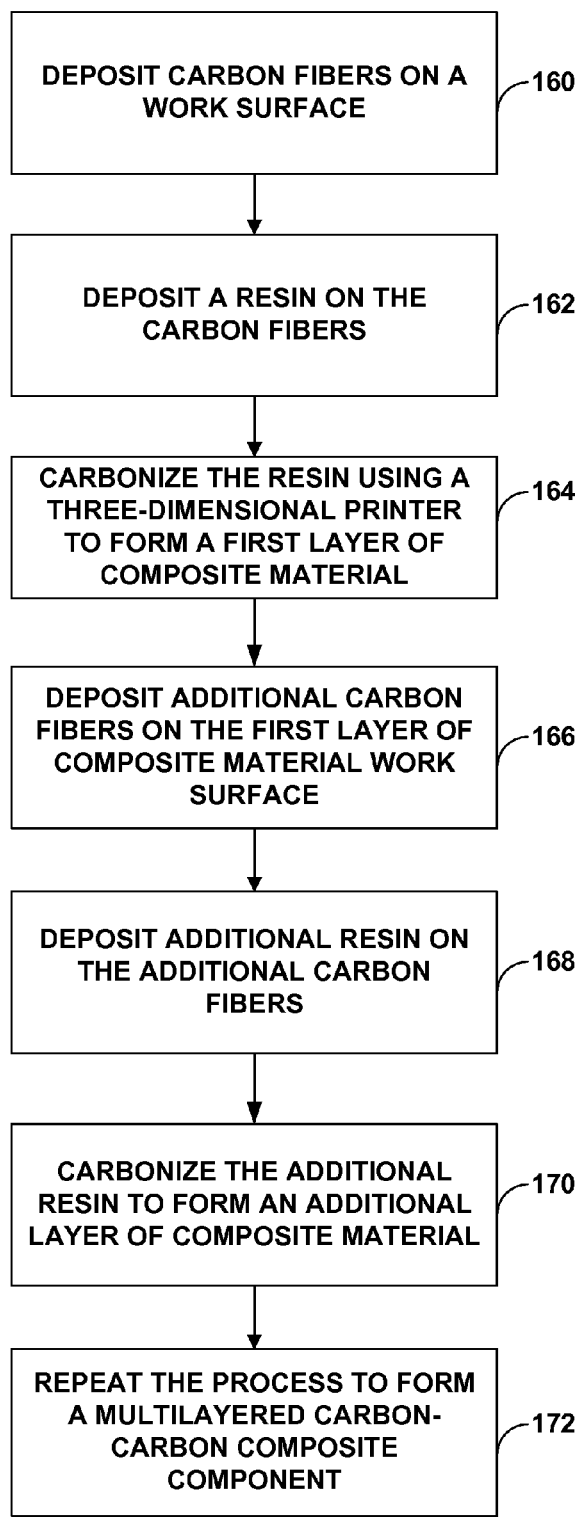
FIG. 11 is a flow diagram illustrating an example technique of forming carbon-carbon composite component by depositing carbon fibers on a work surface of a three-dimensional printer followed by depositing resin on the carbon fibers and subsequently carbonizing the resin using a carbonizer of three-dimensional printer to form multiple composite layers of composite material.

FIG. 11 is flow diagram illustrating another example technique of forming carbon-carbon composite component 50 by first depositing carbon fibers on a work surface of a three-dimensional printer followed by depositing resin on the carbon fibers and subsequently carbonizing the resin using a carbonizer of the three-dimensional printer to form multiple composite layers 54 of composite material 52 in accordance with aspects of the disclosure. For ease of illustration, the example technique of FIG. 11 is described as being performed via print system 120 of FIG. 8; however, other systems suitable for carrying out the three-dimensional printing to form the carbon-carbon composite are contemplated.

As shown in FIG. 11, carbon fibers are initially deposited on work surface 66 (160). As described above, in some examples, the carbon fibers may be prefabricated as a sheet of carbon fibers that is used as the basis for forming the carbon fibers 53 of each respective layer of composite layers 54. In other examples, as described above, system 120 may be configured to deposit the carbon fibers on work surface 66 (160) using a carbon fiber material feed and associated print head (not shown) to deposit carbon fiber material using a three-dimensional printing process. Once the carbon fibers are deposited on work surface 66 (160), controller 70 may control resin feed 102 and print head 68 of system 120 to deposit resin on the recently deposited carbon fibers, allowing the resin to at least partially infiltrate the carbon fibers (162). Controller 70 may then control carbonizer 74 to induce carbonization of the resin to form carbonized matrix material 55 and, if needed, carbonize the carbon fibers to form carbon fibers 53 (164), thereby forming a first layer of composite material 52 (e.g., layer 54X$_1$). Again, throughout the process, controller 70 may control the position of print head 68 and carbonizer 74 via one or more control arms 72 to form the resulting layer of composite material 52.

Next, additional carbon fibers may be deposited on the recently formed first layer of composite material 52 using, for example, one of the techniques described above (166). Controller 70 may again control resin feed 102 and print head 68 to deposit resin on the recently added carbon fibers, allowing the resin to at least partially infiltrate the additional carbon fibers (168). Controller 70 may then control carbonizer 74 to induce carbonization of the resin to form an additional layer of composite material 52 on the first layer of composite material 52 (170). Steps (166) through (170) may be repeated as many times as desired to produce a multi-layered carbon-carbon composite component 50 having a desired geometry (172).

Examples of different techniques for forming carbon-carbon composite materials have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    depositing a first layer of material on a work surface of a three-dimensional printing system, wherein the first layer of material comprises a resin and at least one of a carbon fiber or a carbon fiber precursor material, and wherein depositing the first layer of material comprises depositing the resin on the work surface via at least one print head of the three-dimensional printing system;
    carbonizing the resin of the first layer of material to form a first layer of carbon-carbon composite comprising carbon fibers and a carbonized matrix material, wherein carbonizing the resin comprises carbonizing localized sections of the resin of the first layer of material using a carbonizer of the three-dimensional printer system to convert the resin to the carbonized matrix material;
    depositing an additional layer of material on the first layer of carbon-carbon composite, the additional layer of material comprising the resin and at least one of the carbon fiber or the carbon fiber precursor material, and wherein depositing the additional layer of material comprises depositing the resin on the first layer of carbon-carbon composite via the at least one print head of the three-dimensional printing system; and
    carbonizing localized sections of the resin of the additional layer of material using the carbonizer to convert the resin of the additional layer of material to the carbonized matrix material.

2. The method of claim 1, wherein depositing the first layer of material comprises:
    depositing a fiber layer of the at least one of the carbon fiber or the carbon fiber precursor material; and
    depositing the resin on the fiber layer via the at least one print head of the three-dimensional printing system.

3. The method of claim 2, wherein depositing the fiber layer of the at least one of the carbon fiber or the carbon fiber precursor material comprises depositing the fiber layer via the at least one print head of the three-dimensional printing system.

4. The method of claim 1, wherein depositing the first layer of material comprises:
    coating a carbon filament with the resin to form a coated carbon filament, wherein the carbon filament comprises the at least one of the carbon fiber or the carbon fiber precursor material; and
    depositing the coated carbon filament on the work surface of a three-dimensional printing system via the at least one print head of the three-dimensional printing system to form the first layer of material.

5. The method of claim 1, wherein carbonizing localized sections of the resin of the first layer of material using the carbonizer comprises carbonizing localized sections that define an area of about 0.1 mm to about 10 mm in diameter.

6. The method of claim 1, wherein the carbonizer comprises at least one of a focused plasma torch, a concentrated laser, or an induction heat source.

7. The method of claim 6, wherein carbonizing localized sections of the resin comprises, heating a localized area of the resin via the carbonizer to a temperature above about 450 degrees centigrade to convert the resin of the localized area of the resin to the carbonized matrix material.

8. The method of claim 1, wherein depositing the additional layer of material and carbonizing localized sections of the resin of the additional layer of material comprises repeatedly depositing the additional layer of material and carbonizing localized sections of the resin of the additional layer of material to form at least about 15 layers of carbon-carbon composite.

\* \* \* \* \*